US011160033B2

(12) United States Patent
Noh et al.

(10) Patent No.: US 11,160,033 B2
(45) Date of Patent: Oct. 26, 2021

(54) METHOD AND APPARATUS FOR CONTROLLING TRANSMIT POWER IN SIDELINK COMMUNICATION SYSTEM

(71) Applicant: ELECTRONICS AND TELECOMMUNICATIONS RESEARCH INSTITUTE, Daejeon (KR)

(72) Inventors: Go San Noh, Daejeon (KR); Seon Ae Kim, Daejeon (KR); Il Gyu Kim, Chungcheongbuk-do (KR); Jun Hyeong Kim, Daejeon (KR); Hee Sang Chung, Daejeon (KR); Dae Soon Cho, Daejeon (KR); Sung Woo Choi, Daejeon (KR); Seung Nam Choi, Daejeon (KR); Jung Pil Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/904,341

(22) Filed: Jun. 17, 2020

(65) Prior Publication Data

US 2020/0404594 A1 Dec. 24, 2020

(30) Foreign Application Priority Data

Jun. 18, 2019 (KR) .......................... 10-2019-0071968
Aug. 16, 2019 (KR) .......................... 10-2019-0100034
May 28, 2020 (KR) .......................... 10-2020-0064236

(51) Int. Cl.
*H04W 72/04* (2009.01)
*H04W 52/24* (2009.01)

(52) U.S. Cl.
CPC ....... *H04W 52/242* (2013.01); *H04W 52/245* (2013.01); *H04W 72/04* (2013.01)

(58) Field of Classification Search
USPC ........................................................ 455/522
See application file for complete search history.

(56) References Cited

U.S. PATENT DOCUMENTS 8,285,319 B2 * 10/2012 Shin ..................... H04W 52/241
455/522
8,315,661 B2 * 11/2012 Zong ..................... H04W 52/16
455/522

(Continued)

FOREIGN PATENT DOCUMENTS

WO 2017/034258 A1 3/2017
WO 2018/038525 A1 3/2018
WO 2018/203738 A1 11/2018

*Primary Examiner* — Hai V Nguyen
(74) *Attorney, Agent, or Firm* — Rabin & Berdo, P.C.

(57) ABSTRACT

An operation method of a first terminal, performed in a communication system, may comprise receiving sidelink resource allocation information from a base station; receiving a first sidelink signal from a second terminal based on the sidelink resource allocation information; calculating a path loss experienced by the first sidelink signal based on the first sidelink signal; transmitting a second sidelink signal including information on the path loss experienced by the first sidelink signal to the second terminal; and receiving, from the second terminal, a third sidelink signal to which a sidelink transmit power determined based on the path loss is allocated.

11 Claims, 10 Drawing Sheets

(56) References Cited

U.S. PATENT DOCUMENTS

| | | | |
|---|---|---|---|
| 8,644,876 B2* | 2/2014 | Shin | H04W 52/242 |
| | | | 455/522 |
| 9,014,747 B2* | 4/2015 | Shin | H04W 52/08 |
| | | | 455/522 |
| 9,918,281 B2* | 3/2018 | Xu | H04W 52/146 |
| 9,930,559 B2* | 3/2018 | Kusashima | H04L 5/0057 |
| 10,264,534 B1* | 4/2019 | Park | H04W 52/265 |
| 10,383,067 B2* | 8/2019 | Lin | H04W 52/365 |
| 10,863,447 B2* | 12/2020 | Guo | H04B 17/327 |
| 11,044,650 B2* | 6/2021 | Chen | H04W 36/08 |
| 2006/0168343 A1* | 7/2006 | Ma | H04W 52/38 |
| | | | 709/245 |
| 2013/0148589 A1* | 6/2013 | Smith | H04W 74/002 |
| | | | 370/329 |
| 2014/0087744 A1 | 3/2014 | Yang et al. | |
| 2014/0105042 A1* | 4/2014 | Cui | H04B 17/26 |
| | | | 370/252 |
| 2016/0183198 A1* | 6/2016 | Xu | H04W 52/241 |
| | | | 455/522 |
| 2017/0005770 A1* | 1/2017 | Shimezawa | H04L 5/0092 |
| 2017/0048905 A1 | 2/2017 | Yun et al. | |
| 2017/0078903 A1* | 3/2017 | Kusashima | H04W 52/02 |
| 2018/0041969 A1 | 2/2018 | Kwak et al. | |
| 2018/0049129 A1 | 2/2018 | Li et al. | |
| 2018/0206176 A1 | 7/2018 | Panteleev et al. | |
| 2018/0359707 A1 | 12/2018 | Chae | |
| 2019/0090205 A1* | 3/2019 | Gong | H04W 52/242 |
| 2019/0208476 A1 | 7/2019 | Wu et al. | |
| 2019/0239203 A1 | 8/2019 | Chae | |
| 2019/0281487 A1* | 9/2019 | Liu | H04L 5/0057 |
| 2020/0022040 A1* | 1/2020 | Chen | H04W 72/046 |
| 2020/0022089 A1* | 1/2020 | Guo | H04W 92/18 |
| 2020/0092685 A1* | 3/2020 | Fehrenbach | H04B 7/2606 |
| 2020/0163028 A1 | 5/2020 | Chae et al. | |
| 2020/0322095 A1* | 10/2020 | Park | H04L 1/1864 |

* cited by examiner

METHOD AND APPARATUS FOR CONTROLLING TRANSMIT POWER IN SIDELINK COMMUNICATION SYSTEM

CROSS-REFERENCE TO RELATED APPLICATIONS

This application claims priority to Korean Patent Applications No. 10-2019-0071968 filed on Jun. 18, 2019, No. 10-2019-0100034 filed on Aug. 16, 2019, and No. 10-2020-0064236 filed on May 28, 2020 with the Korean Intellectual Property Office (KIPO), the entire contents of which are hereby incorporated by reference.

BACKGROUND

1. Technical Field

The present disclosure relates generally to methods for performing a transmit power control in a communication system, and more specifically, to methods and apparatuses for performing a transmit power control in sidelink communication.

2. Related Art

Terminals in a cellular wireless communication network may perform power control. In particular, the terminal may perform power control in uplink to transmit a control channel, a data channel, a random access channel, and a reference signal, and the base station may secure a receive power. In addition, by supporting such the uplink power control, it is made possible to maximize a battery life of the terminal and reduce interferences to neighbor cells.

The uplink power control scheme may be classified into an open-loop power control scheme and a closed-loop power control scheme. The terminal may measure a path loss from the base station based on a preconfigured parameter, and then perform the open-loop power control to determine an uplink transmit power based on the measured path loss. The transmit power of the terminal may be determined based on various parameters including the measured path loss as well as a targeted receive power at the target base station, a bandwidth, a modulation and coding scheme (MCS), and/or the like.

Further, in addition to the open-loop power control technique, the terminal may perform the closed-loop power control in which an uplink transmit power of the terminal is increased or decreased by a predetermined step based on a feedback between the terminal and the base station. The base station may transmit a transmit power control (TPC) command, and the TPC command may further include a signal-to-noise ratio (SNR) or signal-to-interference-and-noise ratio (SINR), an SNR or SINR measured by the base station through actual uplink transmission, and a power headroom report (PHR) obtained from the terminal.

Meanwhile, when information is desired to be directly transferred between terminals located in the same cell or different cells, sidelink communication may be used. The sidelink communication may refer to communication through which voice, data, etc. are directly transmitted or received without going through a base station (e.g., evolved NodeB (eNB) and/or next generation NodeB (gNB)) by establishing a direct link between the terminals. The sidelink communication may mean machine-to-machine (M2M) communication, machine type communication (MTC), or the like. In addition, the sidelink communication may have meaning of including user equipment-to-user equipment (UE-to-UE) communication, peer-to-peer communication, and the like. Similarly to the uplink power control, the terminals may also perform power control also in the sidelink communication. In particular, when a transmitting terminal and a receiving terminal or a receiving terminal group perform communications based on a unicast scheme or groupcast scheme, the power control method should be more effective.

SUMMARY

Accordingly, exemplary embodiments of the present disclosure provide methods and apparatuses for effectively transmitting and receiving a sidelink signal by controlling a transmit power for the sidelink signal based on a path loss between terminals when transmitting the sidelink signal in a sidelink communication system.

An operation method of a first terminal performing sidelink communication may comprise receiving sidelink resource allocation information from a base station; receiving a first sidelink signal from a second terminal based on the sidelink resource allocation information; calculating a path loss experienced by the first sidelink signal based on the first sidelink signal; transmitting a second sidelink signal including information on the path loss experienced by the first sidelink signal to the second terminal; and receiving, from the second terminal, a third sidelink signal to which a sidelink transmit power determined based on the path loss is allocated.

The first sidelink signal may include information on a transmit power of the first sidelink signal, and the second sidelink signal may include information on a received signal strength of the first sidelink signal.

The information on the received signal strength of the first sidelink signal may be a value obtained by performing layer-3 (L3) filtering on a layer-1 (L1)-reference signal received power (RSRP) of the first sidelink signal.

The second sidelink signal may further include at least one of information on a change in the path loss experienced by the first sidelink signal and information on a change in the received signal strength of the first sidelink signal.

The sidelink resource allocation information may include information on a transmit power range of sidelink signals of the first terminal, and a transmit power of the second sidelink signal may be within the transmit power range.

The sidelink resource allocation information may include information indicating a first resource pool and information indicating a second resource pool configured in a radio resource different from a radio resource of the first resource pool.

The second sidelink signal may be transmitted through the first resource pool and the second resource pool which are different from each other, and the information on the path loss experienced by the first sidelink signal, which is included in the second sidelink signal, may be transmitted through the second resource pool.

An operation method of a first terminal performing sidelink communication may comprise receiving sidelink resource allocation information from a base station; transmitting a first sidelink signal to a second terminal based on the sidelink resource allocation information; receiving a second sidelink signal including information on a received signal strength of the first sidelink signal from the second terminal; calculating a path loss experienced by the first sidelink signal based on the received signal strength of the first sidelink signal; determining a transmit power of a third sidelink signal based on the path loss experienced by the first sidelink signal; and transmitting the third sidelink signal to the second terminal according to the transmit power of the third sidelink signal.

The sidelink resource allocation information may instruct the first terminal to calculate the path loss experienced by the first sidelink signal.

The operation method may further comprise, when the information on the received signal strength of the first sidelink signal is a layer-1 (L1)-reference signal received power (RSRP) measured by the second terminal, performing layer-3 (L3) filtering on the L1-RSRP after the receiving of the first sidelink signal.

The third sidelink signal may further include information on the transmit power of the third sidelink signal.

The third sidelink signal may further include information on a change in a transmit power of the second sidelink signal compared to a transmit power of the first sidelink signal.

The sidelink resource allocation information may include information indicating a first resource pool and information indicating a second resource pool configured in a radio resource different from a radio resource of the first resource pool.

The second sidelink signal may be transmitted through the first resource pool and the second resource pool which are different from each other, and the information on the path loss experienced by the first sidelink signal, which is included in the second sidelink signal, may be transmitted through the second resource pool.

A terminal performing sidelink communication may comprise a processor; a memory electronically communicating with the processor; and instructions stored in the memory, wherein when the instructions are executed by the processor, the instructions cause the first terminal to: receive sidelink resource allocation information from a base station; transmit a first sidelink signal to a second terminal based on the sidelink resource allocation information; receive a second sidelink signal including information on a received signal strength of the first sidelink signal from the second terminal; calculate a path loss experienced by the first sidelink signal based on a result of receiving the second sidelink signal; determine a transmit power of a third sidelink signal based on the path loss experienced by the first sidelink signal; and transmit the third sidelink signal to the second terminal according to the transmit power of the third sidelink signal.

The sidelink resource allocation information may instruct the first terminal to calculate the path loss experienced by the first sidelink signal.

The second sidelink signal may further include information on the path loss experienced by the first sidelink signal, which is measured by the second terminal based on information on a transmit power of the first sidelink signal and the received signal strength of the first sidelink signal.

The sidelink resource allocation information may include information indicating a first resource pool and information indicating a second resource pool configured in a radio resource different from a radio resource of the first resource pool, the second sidelink signal may be transmitted through the first resource pool and the second resource pool which are different from each other, and the information on the path loss experienced by the first sidelink signal, which is included in the second sidelink signal, may be transmitted through the second resource pool.

The third sidelink signal may further include information on the transmit power of the third sidelink signal.

The third sidelink signal may further include information on a change in a transmit power of the second sidelink signal compared to a transmit power of the first sidelink signal.

According to the exemplary embodiments of the present disclosure, in the sidelink communication system, terminals can reduce power consumption of the terminals by controlling a sidelink transmit power based on a path loss between the terminals. According to the exemplary embodiments of the present disclosure, in the sidelink communication system, terminals can reduce unnecessary interferences between the terminals by effectively controlling a sidelink transmit power based on a path loss between the terminals.

DETAILED DESCRIPTION OF THE EMBODIMENTS

Figure 1:
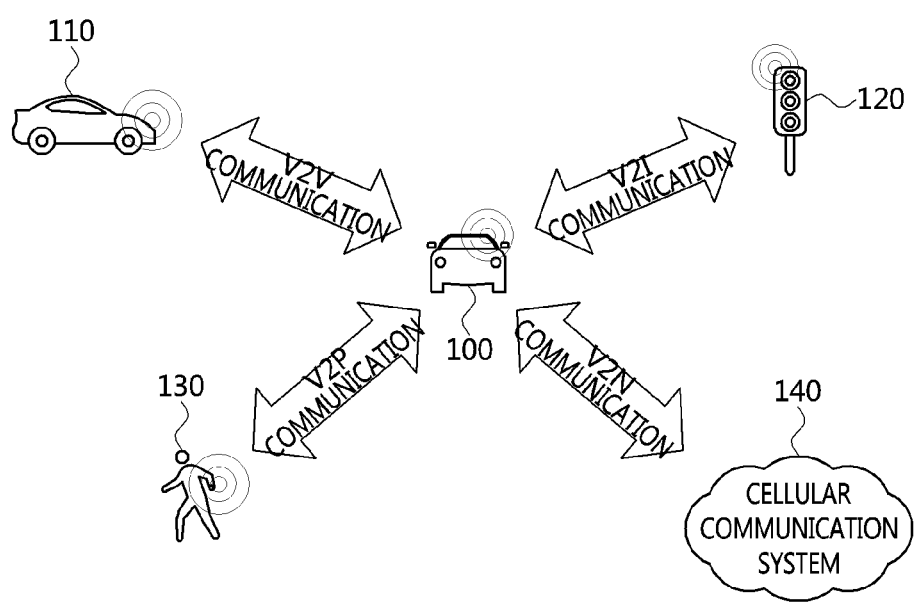
FIG. 1 is a conceptual diagram illustrating V2X communication scenarios.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. However, the communication systems to which exemplary embodiments according to the present disclosure are applied are not restricted to what will be described below. That is, the exemplary embodiments according to the present disclosure may be applied to various communication systems. Here, the term 'communication system' may be used in the same sense as the term 'communication network'.

FIG. 1 is a conceptual diagram illustrating V2X communication scenarios.

As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be performed in a beamforming scheme. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located within the vehicle 100) and a second vehicle 110 (e.g., a communication node located in the vehicle 110). Various driving information such as velocity, heading, time, position, and the like may be exchanged between the vehicles 100 and 110 through the V2V communications. For example, autonomous driving (e.g., platooning) may be supported based on the driving information exchanged via the V2V communications. The V2V communications supported in the cellular communication system 140 may be performed based on "sidelink" communication technologies (e.g., ProSe and D2D communication technologies, and the like). In particular, the communications between the vehicles 100 and 110 may be performed using at least one sidelink channel established between the vehicles 100 and 110.

The V2I communications may include communications between the first vehicle 100 (e.g., the communication node located within the vehicle 100) and an infrastructure (e.g., road side unit (RSU)) 120 located along a road. The infrastructure 120 may also include a traffic light or a street light which is located along the road. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 via the V2I communications. The V2I communications supported in the cellular communication system 140 may also be performed based on sidelink communication technologies (e.g., ProSe and D2D communication technologies, and the like). In particular, the communications between the vehicle 100 and the infrastructure 120 may be performed using sidelink channels.

The V2P communications may include communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 via the V2P communications. The communication node located within the vehicle 100 or the communication node carried by the person 130 may be configured to generate an alarm that provides an indication regarding a danger by detecting a dangerous situation based on the obtained driving information and movement information. The V2P communications supported in the cellular communication system 140 may be performed based on sidelink communication technologies (e.g., ProSe and D2D communication technologies, and the like). In particular, the communications between the communication node located within the vehicle 100 and the communication node carried by the person 130 may be performed using at least one sidelink channel established between the communication nodes.

The V2N communications may be communications between the first vehicle 100 (e.g., the communication node located within the vehicle 100) and a server connected via the cellular communication system 140. The V2N communications may be performed based on the 4G communication technology (e.g., LTE or LTE-A) or the 5G communication technology (e.g., NR). Additionally, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

Figure 2:
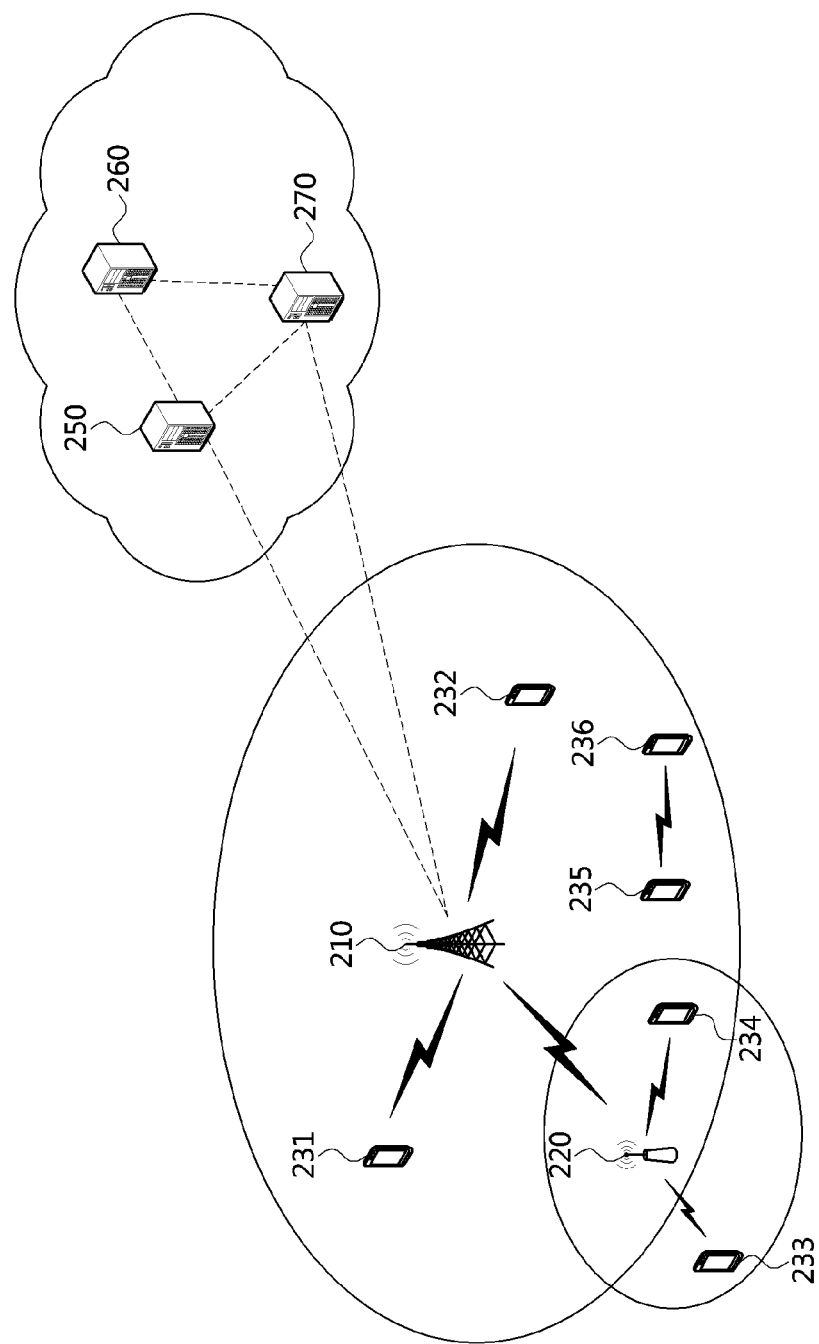
FIG. 2 is a conceptual diagram illustrating exemplary embodiments of a cellular communication system.

FIG. 2 is a conceptual diagram illustrating exemplary embodiments of a cellular communication system.

As shown in FIG. 2, a cellular communication system may include an access network, a core network, and the like. The access network may include a base station 210, a relay 220, User Equipment (UEs) 231 through 236, and the like. The UEs 231 through 236 may include communication nodes located within the vehicles 100 and 110 of FIG. 1, the communication node located within the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, or the core network constituted by the UPF 250, the SMF 260, and the AMF 270 may support the 4G communication technology as well as the 5G communication technology.

The communication nodes (e.g., base station, relay, UE, S-GW, P-GW, MME, UPF, SMF, AMF, etc.) including the cellular communication system may be configured to perform communications using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology. The communication nodes (e.g., base station, relay, UE, S-GW, P-GW, MME, UPF, SMF, AMF, etc.) including the cellular communication system may be configured as follows.

Figure 3:
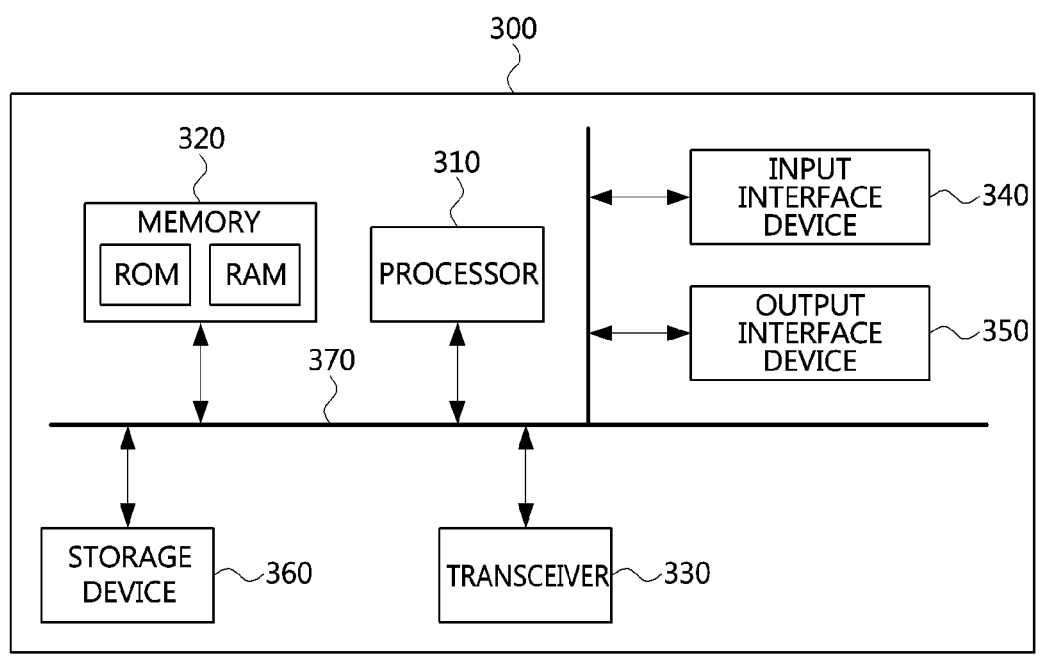
FIG. 3 is a conceptual diagram illustrating exemplary embodiments of a communication node constituting a cellular communication system.

FIG. 3 is a conceptual diagram illustrating exemplary embodiments of a communication node constituting a cellular communication system.

As shown in FIG. 3, a communication node 300 may include at least one processor 310, a memory 320, and a transceiver 330 connected to a network for performing communications. Additionally, the communication node 300 may further include an input interface device 340, an output interface device 350, a storage device 360, and the like. Each component included in the communication node 300 may be configured to communicate with each other as connected via a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may be configured to execute at least one instruction stored in at least one of the memory 320 and the storage device 360. The processor 310 may refer to a central processing unit (CPU), a graphics processing unit (GPU), or a dedicated processor on which methods in accordance with exemplary embodiments of the present disclosure are performed. Each of the memory 320 and the storage device 360 may include at least one of a volatile storage medium and a non-volatile storage medium. For example, the memory 320 may include at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may be configured to transmit signals received from the core network to the UEs 231 through 236 and the relay 220, and transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may be configured to communicate with the base station 210 after being connected to the base station 210.

The relay 220 may be connected to the base station 210 and may be configured to relay communications between the base station 210 and the UEs 233 and 234. In other words, the relay 220 may be configured to transmit signals received from the base station 210 to the UEs 233 and 234, and transmit signals received from the UEs 233 and 234 to the base station 210. The UE 234 may belong to both of the cell coverage of the base station 210 and the cell coverage of the relay 220, and the UE 233 may belong to the cell coverage of the relay 220. In other words, the UE 233 may be located outside the cell coverage of the base station 210. The UEs 233 and 234 may be connected to the relay 220 by performing a connection establishment procedure with the relay 220. The UEs 233 and 234 may be configured to communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may be configured to perform operations corresponding to the base station 210 and operations supported by the base station 210. The UEs 233 and 234 may be configured to perform operations corresponding to the relays 220 and operations supported by the relays 220.

Particularly, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station a subscriber station, a node, a device, an on-broad unit (OBU), or the like.

Figure 4:
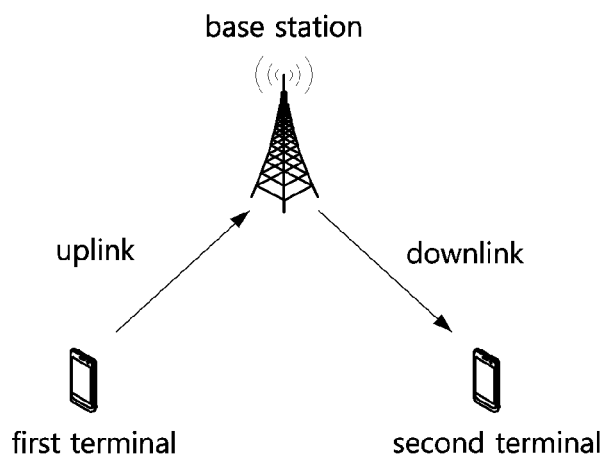
FIG. 4 is a conceptual diagram illustrating a base station-centric communication system.
Figure 5:
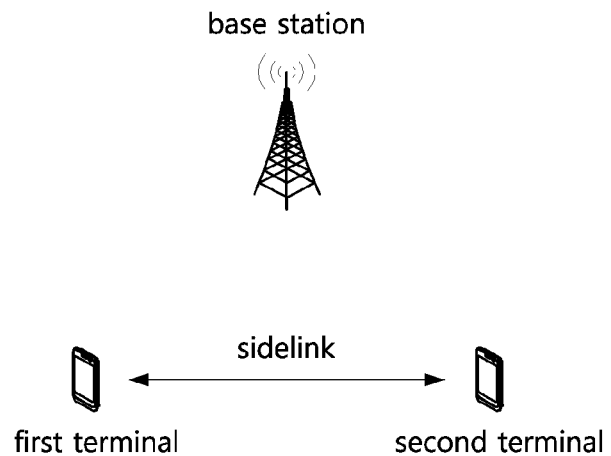
FIG. 5 is a conceptual diagram illustrating a sidelink communication system.

FIG. 4 is a conceptual diagram illustrating a base station-centric communication system, and FIG. 5 is a conceptual diagram illustrating a sidelink communication system.

As shown in FIG. 4, in a base station-centric communication system, a first terminal may transmit data to a base station in uplink, and the base station may transmit the data to a second terminal in downlink. The base station-centric communication system may operate in an indirect communication scheme through the base station. In the indirect communication scheme, a backhaul link and an access link defined in the existing wireless communication system may be used. The backhaul link may mean a link between base stations or a link between a base station and a relay. The access link may mean a link between a base station and a terminal or a link between a relay and a terminal As shown in FIG. 5, a sidelink communication system may mean a device-to-device (D2D) communication system. The sidelink communication may be used as a term for commination between things or an intelligent communication system for things. However, the sidelink communication is not limited thereto, and may mean communication between devices having various forms equipped with communication capability. Meanwhile, a link used for such the communication may be referred to as a sidelink, a direct link, a D2D link, or the like, hereinafter, it will be collectively referred to as the 'sidelink'. In the sidelink communication, data exchange between terminals may be performed without going through a base station. Such the communication scheme may mean a direct communication scheme between devices. The sidelink communication may have an advantage that latency is reduced and less radio resources are used compared to the indirect communication through the conventional base station.

Figure 6:
FIG. 6 is a conceptual diagram illustrating a first scenario of a sidelink communication system.
Figure 7:
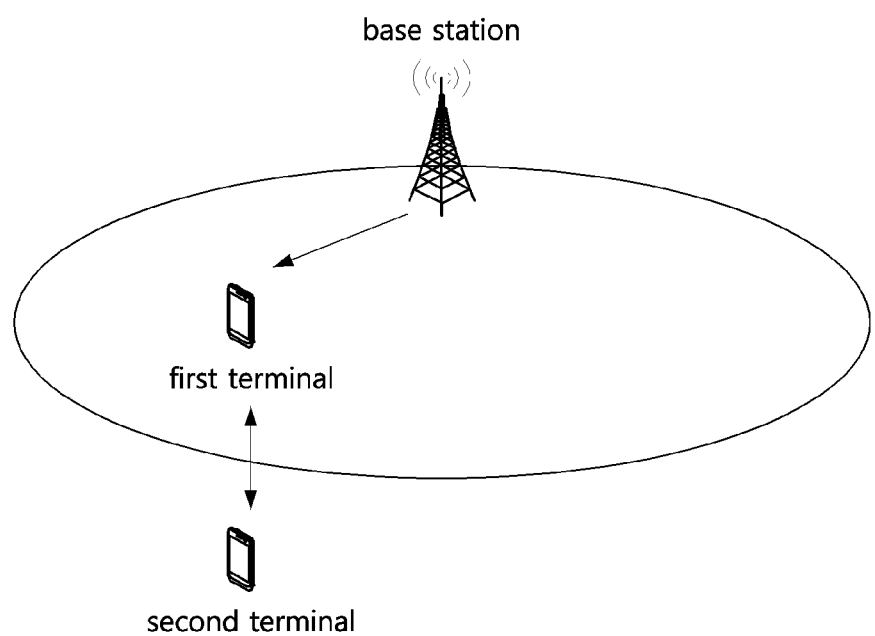
FIG. 7 is a conceptual diagram illustrating a second scenario of a sidelink communication system.
Figure 8:
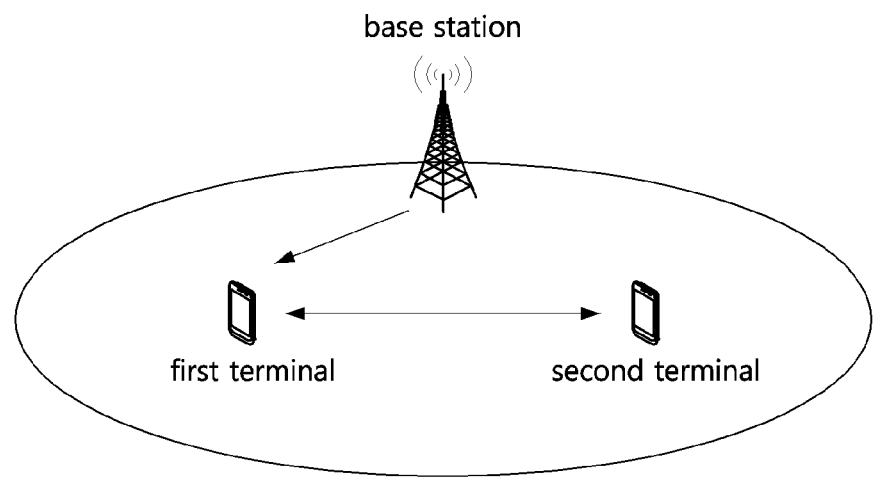
FIG. 8 is a conceptual diagram illustrating a third scenario of a sidelink communication system.
Figure 9:
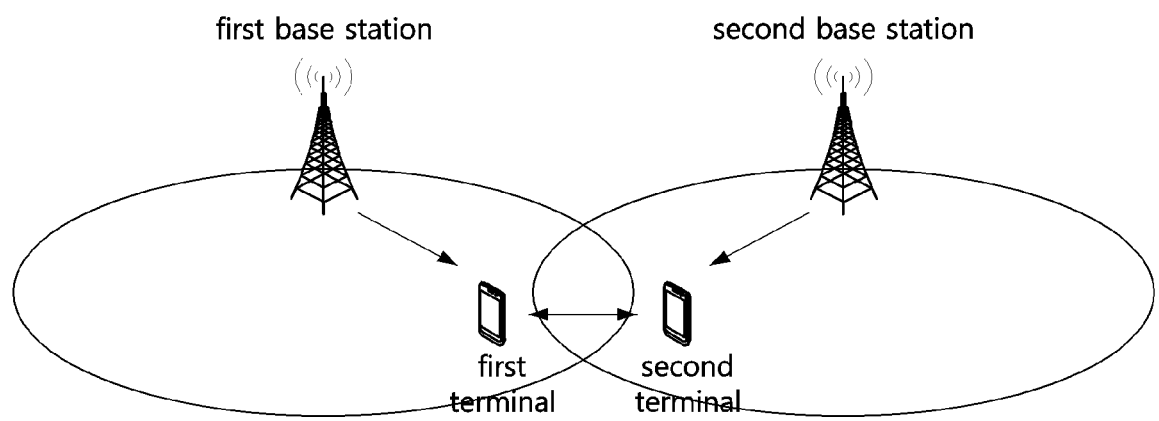
FIG. 9 is a conceptual diagram illustrating a fourth scenario of a sidelink communication system.

FIG. 6 is a conceptual diagram illustrating a first scenario of a sidelink communication system, FIG. 7 is a conceptual diagram illustrating a second scenario of a sidelink communication system, FIG. 8 is a conceptual diagram illustrating a third scenario of a sidelink communication system, and FIG. 9 is a conceptual diagram illustrating a fourth scenario of a sidelink communication system.

The scenarios of the sidelink communication system may be classified according to whether each of the first terminal and the second terminal is located within a base station coverage (or cell coverage) or outside a base station coverage. More specifically, the scenarios of the sidelink communication system may be classified into an 'out-of-coverage' scenario where the first terminal and the second terminal are out of a base station coverage, a 'partial-coverage' scenario where any one of the first terminal and the second terminal is located within a base station coverage, and an 'in-coverage scenario' where the first terminal and the second terminal are within a base station coverage.

Here, according to the number of cells corresponding to the base station coverage, the in-coverage scenario may be classified into an 'in-coverage-single-cell' scenario where the first terminal and the second cell are located within one base station coverage and an 'in-coverage-multi-cell' scenario where the first terminal and the second terminal are located within different base station coverages.

FIG. 6 is a conceptual diagram illustrating an exemplary embodiment of the out-of-coverage scenario where the first terminal and the second terminal are located out of a base station coverage in a sidelink communication system. As shown in FIG. 6, only the first terminal and the second terminal may exist in the corresponding sidelink communication system, and the first terminal and the second terminal may perform sidelink communication without control of the base station.

FIG. 7 is a conceptual diagram illustrating an exemplary embodiment of the partial-coverage scenario where one of the first terminal and the second terminal is located within a base station coverage in a sidelink communication system. As shown in FIG. 7, in the corresponding sidelink communication system, the first terminal located within the base station coverage and the second terminal located outside the base station coverage may exist, and the first terminal located within the base station coverage and the second terminal located outside the base station coverage perform sidelink communication.

FIG. 8 is a conceptual diagram illustrating an exemplary embodiment of the in-coverage-single-cell scenario where the first terminal and the second terminal are located within the same base station coverage. As shown in FIG. 8, in the corresponding sidelink communication system, there may exist the first terminal and the second terminal located within the same base station coverage, and the first terminal and the second terminal may perform sidelink communication under control of the base station within the same base station coverage.

FIG. 9 is a conceptual diagram illustrating an exemplary embodiment of the in-coverage-multi-cell scenario where the first terminal and the second terminal are located within different base station coverages. As shown in FIG. 9, although each of the first terminal and the second terminal is located within the base station coverage in the corresponding sidelink communication system, they may be located in different base station coverages. Each of the first terminal and the second terminal may perform sidelink communication under control of the base station managing each network coverage.

In the present disclosure, for convenience of explanation, the sidelink communication is described by using an example of direct communication between two devices, but the scope of the present disclosure is not limited thereto. The same principles described in the present disclosure may be applied also to sidelink communication between two or more devices.

Figure 10:
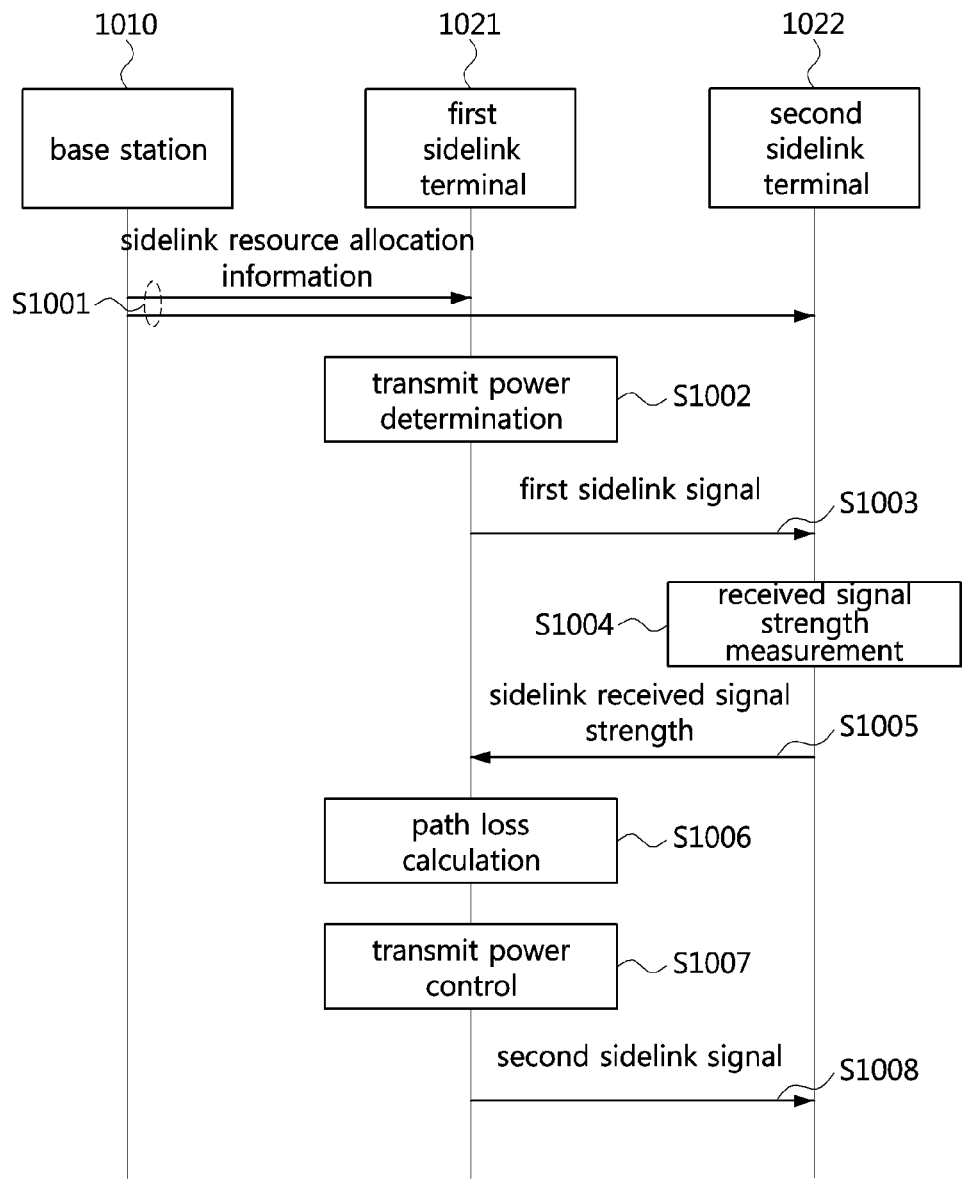
FIG. 10 is a sequence chart illustrating a first exemplary embodiment of a transmit power control method performed in a sidelink communication system.

FIG. 10 is a sequence chart illustrating a first exemplary embodiment of a transmit power control method performed in a sidelink communication system.

As shown in FIG. 10, a sidelink communication system may include a base station 1010, a first terminal 1021, and a second terminal 1022. The base station 1010 may transmit sidelink resource allocation information to the terminals (e.g., the first terminal 1021, the second terminal 1022, etc.) (S1001). The sidelink resource allocation information may include information of radio resources (e.g., resource pool (s)) for transmission of sidelink signals, a transmit power (or, a transmit power range, a list including preconfigured transmit power values, etc.) determined by the base station, the maximum transmit power, a transmission periodicity of sidelink signals, the number of sidelink signal transmissions, and/or the like. In addition, the sidelink resource allocation information may further include information on a filter coefficient of each terminal.

The base station 1010 may determine a terminal to measure a path loss between the first terminal 1021 and the second terminal 1022 among the first terminal 1021 and the second terminal 1022. The base station 1010 may inform the determined terminal that the terminal is determined as the terminal to measure a path loss by a combination of one or more of a radio resource control (RRC) message, a medium access control (MAC) message (e.g., MAC control element (CE)), and a PHY message (e.g., downlink control information (DCI)). The terminal (e.g., the first terminal 1021) receiving the message from the base station 1010 may measure the path loss between the first terminal 1021 and the second terminal 1022.

The first terminal 1021 desiring to transmit a sidelink signal may determine a sidelink transmit power before transmitting the sidelink signal (S1002). The first terminal 1021 may determine the sidelink transmit power based on the path loss between the first terminal 1021 and the second terminal 1022. The path loss between the first terminal 1021 and the second terminal 1022 may be measured by the first terminal 1021 and/or the second terminal 1022.

Alternatively, the first terminal 1021 desiring to transmit a sidelink signal may determine an uplink transmit power of the first terminal 1021 as a sidelink transmit power. The first terminal 1021 may determine a transmit power specified by the base station 1010 or a preconfigured default transmit power as a sidelink transmit power. The first terminal 1021 may transmit a first sidelink signal by applying the determined sidelink transmit power (S1003). The first sidelink signal may include a sidelink demodulation reference signal (DM-RS), a sidelink channel state information reference signal (CSI-RS), a sidelink synchronization signal, and/or the like.

The second terminal 1022 may receive the first sidelink signal from the first terminal 1021 (S1003). The second terminal 1022 may measure a received signal strength of the first sidelink signal. The received signal strength may be at least one of a reference signal received power (RSRP), a reference signal received quality (RSRQ), a signal-to-interference-and-noise ratio (SINR), and a reference signal strength indicator (RSSI).

The second terminal 1022 may measure the received signal strength of the sidelink signal in the physical layer or a layer-1 (L1) (S1004). Alternatively, the second terminal 1022 may filter the sidelink signal in the higher layer or a layer-3 (L3), and apply a result of the filtering to measure the received signal strength of the sidelink signal. The second terminal 1022 may measure the received signal strength of the first sidelink signal by performing the L3 filtering represented by Equation 1.

$$F_n = (1-\alpha) \cdot F_{n-1} + \alpha \cdot M_n \quad \text{[Equation 1]}$$

In Equation 1, $F_n$ and $F_{n-1}$ may respectively indicate measured values after and before being updated from a current time point n, and $M_n$ may indicate a current measured value. $\alpha$ may indicate a filter coefficient. The second terminal 1022 may configure the filter coefficient according to filter characteristics.

The second terminal 1022 may transmit a signal including information on the received signal strength of the measured first sidelink signal to the first terminal 1021 (S1005). The first terminal 1021 may receive the sidelink signal from the second terminal 1022, and obtain the information on the received signal strength of the first sidelink signal from the received sidelink signal. For example, the first terminal 1021 may obtain an L1-RSRP value from the second terminal 1022, and apply L3 filtering on the obtained L1-RSRP value. Alternatively, the first terminal 1021 may obtain an L3-filtered RSRP value from the second terminal 1022.

According to an exemplary embodiment of the present disclosure, the first terminal 1021 transmitting the sidelink signal may measure a path loss between the terminals (S1006). When the first terminal 1021 measures the path loss between the terminals, the first terminal 1021 may measure the path loss based on the information on the received signal strength of the sidelink signal measured by the second terminal 1022 (S1006). For example, the first terminal 1021 may calculate the path loss between the terminals based on a difference between the transmit power of the first sidelink signal and the received signal strength (e.g., L3-filtered RSRP, etc.) of the first sidelink signal, which is obtained from the sidelink signal from the second terminal 1022 (S1006).

The first terminal 1021 may determine a transmit power of another sidelink signal (e.g., second sidelink signal) based on the path loss between the terminals (S1007). The first terminal 1021 may determine a transmit power according to a level required for the second sidelink signal as the transmit power of the sidelink signal. The first terminal 1021 may determine the transmit power of the sidelink signal in proportion to the path loss between the terminals. The first terminal 1021 may determine the sidelink transmit power to be completely proportional (i.e., $\alpha=1$) to the path loss between the terminals, or to be partially proportional (i.e., $0 \le \alpha < 1$) to the path loss between the terminals.

According to another exemplary embodiment, the first terminal 1021 may determine the sidelink transmit power to be proportional to a bandwidth of the sidelink signal (S1007). Alternatively, the first terminal 1021 may determine the sidelink transmit power in proportion to a modulation and coding scheme (MCS) of the first sidelink signal. The relationship between the sidelink transmit power and the path loss between the terminals may be expressed as an example of Equation 2 below.

$$P_{sidelink} \propto P_{0,r} + \alpha \cdot PL_{r,t} \quad \text{[Equation 2]}$$

The first terminal 1021 may configure the sidelink transmit power to be lower than the maximum transmit power of the first terminal 1021. When the first terminal 1021 is located within the coverage of the base station 1010, the first terminal 1021 may configure the sidelink transmit power to be lower than the uplink maximum transmit power of the terminal.

The first terminal 1021 may transmit the second sidelink signal by applying the determined sidelink transmit power (S1008). For example, the first terminal 1021 may transmit a PSCCH, PSSCH, and/or PSFCH by applying the determined sidelink transmit power. The transmit powers of the sidelink channels (e.g., PSCCH, PSSCH, PSFCH, etc.) of the second sidelink signal may be the same.

The second sidelink signal transmitted by the first terminal 1021 may further include information on the sidelink transmit power (i.e., sidelink transmit power information). Accordingly, the first terminal 1021 may transmit the sidelink transmit power information to the second terminal 1022. The second terminal 1022 may measure the path loss, L3-filtered RSRP, or the like based on the sidelink transmit power information included in the second sidelink signal.

According to an exemplary embodiment of the present disclosure, the first terminal 1021 may generate an SCI including the sidelink transmit power information, and may transmit a PSCCH including the SCI to the second terminal 1022.

The first terminal 1021 that transmits the sidelink transmit power information through the SCI may transmit the SCI by applying an one-stage SCI transmission scheme and/or a two-stage SCI transmission scheme. According to an exemplary embodiment of the present disclosure, the first terminal 1021 may transmit the SCI through different radio resources by applying the two-stage SCI transmission scheme, and the different radio resources may be allocated as described below.

Figure 11A:
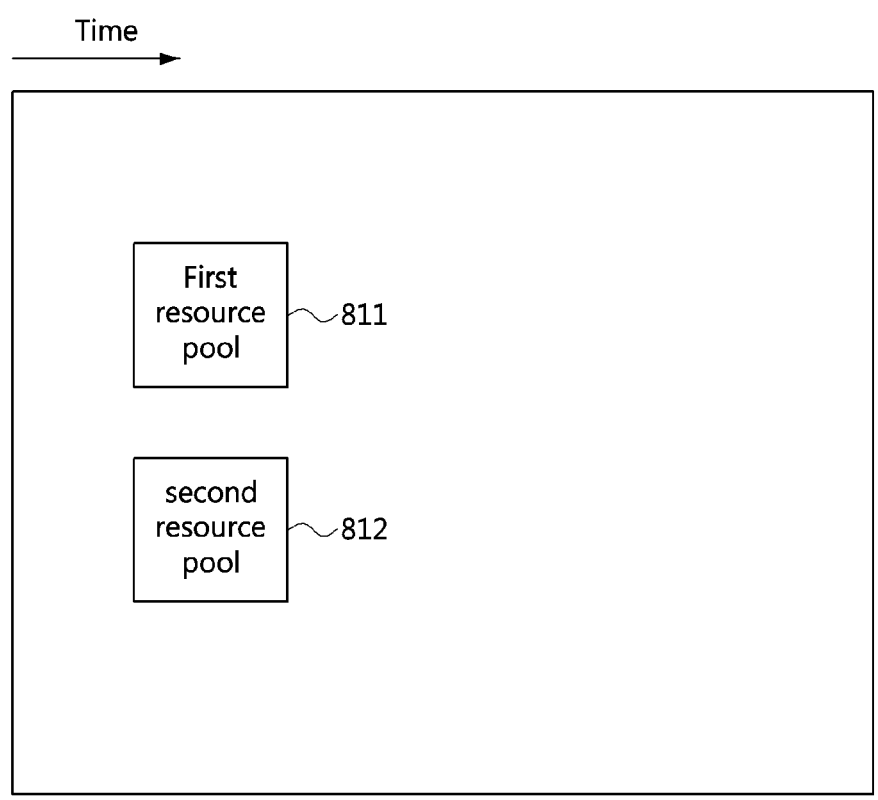
FIGS. 11A to 11C are conceptual diagrams illustrating exemplary embodiments of resource pools within radio resources configured according to sidelink configuration information.
Figure 11B:
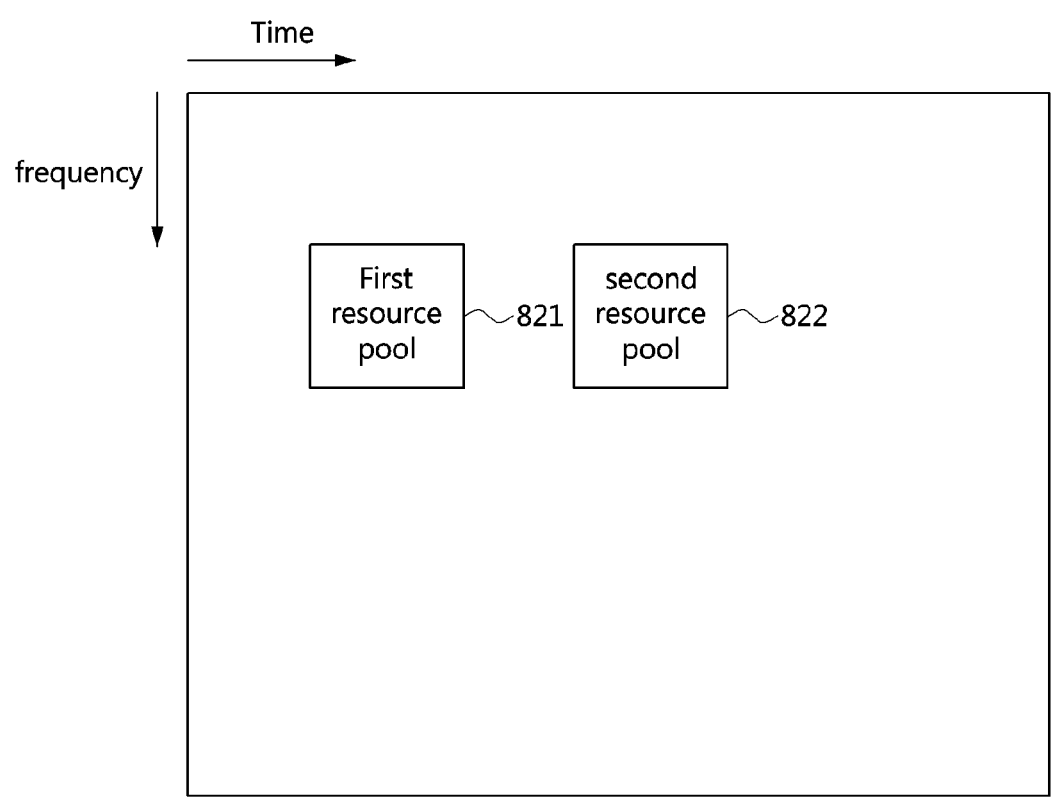
Figure 11C:
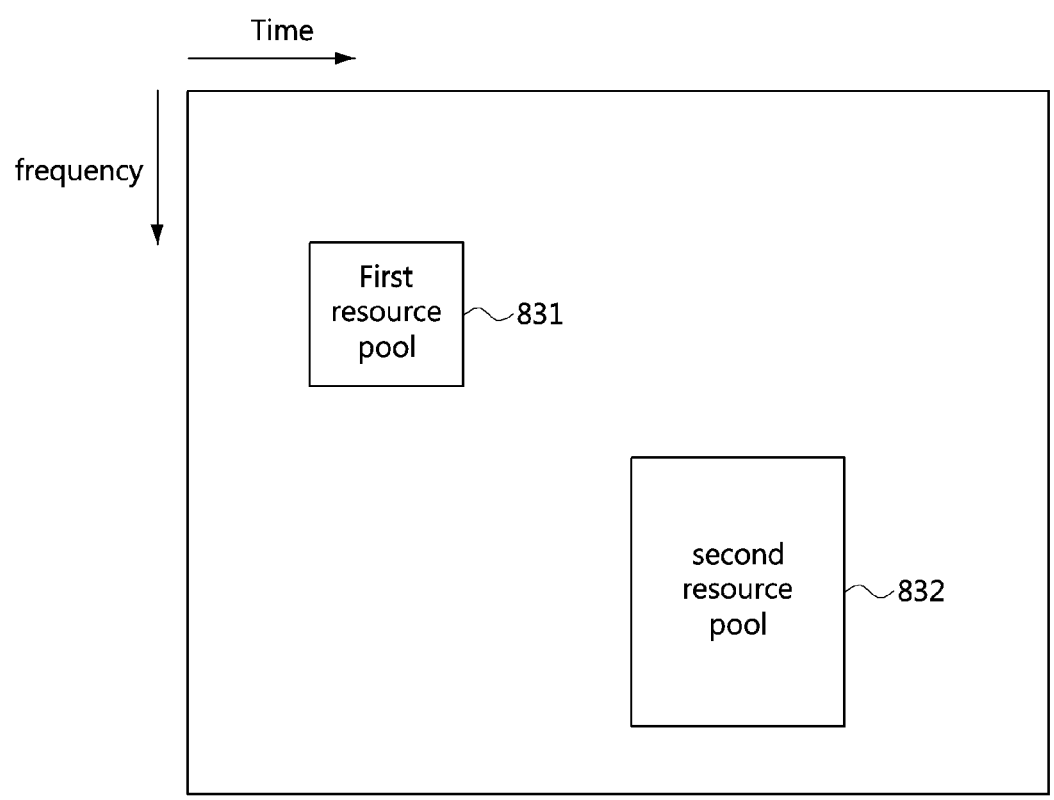

FIGS. 11A to 11C are conceptual diagrams illustrating exemplary embodiments of resource pools within radio resources configured according to sidelink configuration information.

Referring to FIGS. 11A to 11C, the base station 1010 may designate a plurality of resource pools for transmission of sidelink signals within radio resources (e.g., time and frequency resources, etc.). For example, the base station 1010 may designate a first resource pool and a second resource pool for transmission of sidelink signals within the radio resources. Within the radio resources, the first resource pool and the second resource pool may be designated separately from each other. Referring to FIG. 11A, the first resource pool and the second resource pool may be specified separately with a predetermined interval in the frequency domain Referring to FIG. 11B, the first resource pool and the second resource pool may be designated separately with a predetermined interval in the time domain. In addition, referring to FIG. 11C, the first resource pool and the second resource pool may be designated separately with predetermined intervals in the frequency domain and the time domain.

The first terminal 1021 may transmit two messages using different radio resources divided according to time or frequency, as in the exemplary embodiments of FIGS. 11A to 11C. The first message may be a message that can be demodulated and decoded by all terminals. The first message may include information necessary for sidelink channel sensing. In addition, the second message may be a message that can be demodulated and decoded only by specific terminals. The second message may include control information necessary for demodulation of a sidelink channel (e.g., PSSCH). The sidelink transmit power information may be included in the second message.

Referring to FIG. 10 again, according to another exemplary embodiment of the present disclosure, the first terminal 1021 may generate a sidelink-shared channel (SL-SCH) including the sidelink transmit power information, and transmit a PSSCH including the SL-SCH to the second terminal 1022.

The first terminal 1021 that transmits the sidelink transmit power information through the SL-SCH may transmit the sidelink transmit power information through an RRC message and/or a MAC-CE message. The first terminal 1021 may transmit the sidelink transmit power information to the base station 1010 through uplink control information (UCI) of a physical uplink control channel (PUCCH) and/or a physical uplink shared channel (PUSCH). The base station 1010 obtaining the sidelink transmit power information from the first terminal 1021 may transmit the corresponding information to the second terminal 1022 through a downlink signal such as a physical downlink control channel (PDCCH) and/or a physical downlink shared channel (PDSCH).

The first terminal 1021 may transmit the sidelink transmit power information having a transmit power value form of watts or decibels (dBm) to the second terminal 1022. Alternatively, the first terminal 1021 may transmit to the second terminal 1022 the sidelink transmit power information having a form of an index indicating one value belonging to a list of the predefined number of transmit power values of watts or dBm, which is configured by an RRC message or preconfigured. The sidelink transmit power information may be a bit string obtained by converting the index indicating the one value belonging to the list of transmit power values.

According to an exemplary embodiment of the present disclosure, the first terminal 1021 may initially transmit a sidelink signal including the entire sidelink transmit power information by a preconfigured number of times. In addition, the first terminal 1021 that has transmitted the sidelink signal by the preconfigured number of times may transmit a sidelink signal including partial information based on least significant bits (LSBs) of the sidelink transmit power information.

According to another exemplary embodiment of the present disclosure, the first terminal 1021 may initially transmit a sidelink signal including the sidelink transmit power information by a preconfigured number of times. In addition, the first terminal 1021 that has transmitted the sidelink signal by the preconfigured number of times may transmit a sidelink signal including information on a change in the sidelink transmit power. The information on the change in the sidelink transmit power may indicate an absolute change amount and/or a change ratio of the sidelink transmit power. For example, when the sidelink transmit power of the previously transmitted sidelink signal is X dBm and the sidelink transmit power of the currently transmitted sidelink signal is Y dBm, the sidelink signal may include a difference value of (Y−X) dBm. A range of the difference between the transmit powers of the sidelink signal may be configured to be smaller than the minimum-to-maximum range of the sidelink transmit power. For example, when the sidelink transmit power of the previously transmitted sidelink signal is X dBm and the sidelink transmit power of the currently transmitted sidelink signal is Y dBm, the sidelink signal may include a change ratio value of (Y/X*100)%.

Figure 12:
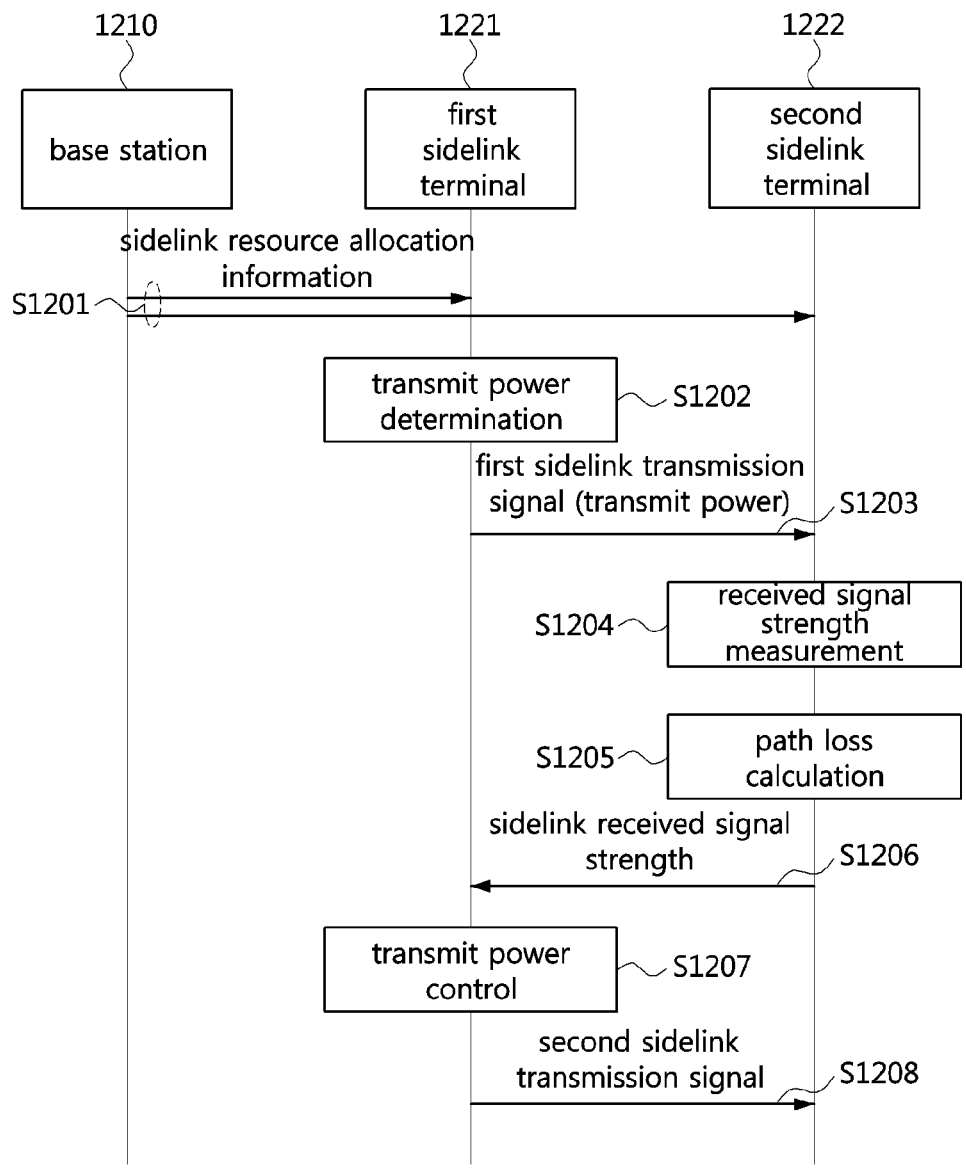
FIG. 12 is a sequence chart illustrating a second exemplary embodiment of a transmit power control method performed in a sidelink communication system.

FIG. 12 is a sequence chart illustrating a second exemplary embodiment of a transmit power control method performed in a sidelink communication system.

As shown in FIG. 12, a sidelink communication system may include a base station 1210, a first terminal 1221, and a second terminal 1222. The base station 1210 may transmit sidelink resource allocation information to the terminals (e.g., the first terminal 1221, the second terminal 1222, etc.) (S1201). The sidelink resource allocation information may include information of radio resources (e.g., resource pool(s)) for transmission of sidelink signals, a transmit power (or, a transmit power range, a list including preconfigured transmit power values, etc.) determined by the base station, the maximum transmit power, a transmission periodicity of sidelink signals, the number of sidelink signal transmissions, and/or the like.

The base station 1210 may determine a terminal to measure a path loss between the first terminal 1221 and the second terminal 1222 among the first terminal 1221 and the second terminal 1222. The base station 1210 may inform the determined terminal that the terminal is determined as the terminal to measure a path loss by a combination of one or more of a radio resource control (RRC) message, a medium access control (MAC) message (e.g., MAC control element (CE)), and a PHY message (e.g., downlink control information (DCI)). The terminal (e.g., the second terminal 1222) receiving the message from the base station 1210 may measure the path loss between the first terminal 1221 and the second terminal 1222.

The first terminal 1221 desiring to transmit a sidelink signal may determine a sidelink transmit power before transmitting the sidelink signal (S1202). The first terminal 1221 may determine the sidelink transmit power based on the path loss between the first terminal 1221 and the second terminal 1222. The path loss between the first terminal 1221 and the second terminal 1222 may be measured by the first terminal 1221 and/or the second terminal 1222.

The first terminal 1221 may transmit a first sidelink signal by applying the determined sidelink transmit power (S1203). The first sidelink signal transmitted by the first terminal 1221 may include a sidelink DM-RS, a sidelink CSI-RS, a sidelink synchronization signal, and/or the like. In addition, the first sidelink signal may further include sidelink transmit power information. Accordingly, the first terminal 1221 may transfer the sidelink transmit power information to the second terminal 1222.

The second terminal 1222 receiving the first sidelink signal in the step S1203 may measure a received signal strength of the first sidelink signal (S1204). The second terminal 1222 may measure at least one received signal strength among RSRP, RSRQ, SINR, and RSSI of the first sidelink signal. The second terminal 1222 may measure the received signal strength of the sidelink signal in the physical layer or the layer-1 (L1). Alternatively, the second terminal 1222 may filter the sidelink signal in the higher layer or the layer-3 (L3), and apply a result of the filtering to measure the received signal strength of the sidelink signal. The second terminal 1222 applying the L3 filtering may perform the L3 filtering by using the transmit power value obtained from the transmitting terminal (i.e., first terminal 1221).

The first sidelink signal transmitted for measurement of the received signal strength may include a sidelink DM-RS or a sidelink CSI-RS.

The second terminal 1222 may measure a path loss value between the terminals based on the measured received signal strength of the first sidelink signal and the sidelink transmit power information obtained from the first sidelink signal (S1205). For example, the second terminal 1222 may calculate the path loss between the terminals by using a difference between the obtained sidelink transmit power and the measured received signal strength (e.g., L3-filtered RSRP, etc.) (S1205).

According to an exemplary embodiment of the present disclosure, when the second terminal 1222 measures the path loss between the terminals, the second terminal 1222 may measure the path loss between the terminals based on the sidelink transmit power value obtained from the first terminal 1220 and the measured received signal strength of the sidelink signal.

The second terminal 1222 that transmits a signal including information on the received signal strength of the sidelink signal (i.e., sidelink received signal strength information) to the first terminal 1221 may transmit the sidelink received signal strength information of the sidelink signal (e.g., L1-RSRP, L1-RSRQ, L1-RSSI, L1-SINR, L3-RSRP, or L3-RSRQ) to the first terminal 1221 (S1206).

According to an exemplary embodiment of the present disclosure, the second terminal 12220 may generate an SCI including the sidelink received signal strength information, and may transmit a PSCCH including the SCI to the first terminal 1221 (S1206)).

The second terminal 1222 that transmits the sidelink received signal strength information through the SCI may transmit the SCI by applying the one-stage SCI transmission scheme and/or the two-stage SCI transmission scheme. According to an exemplary embodiment of the present disclosure, the second terminal 1222 may transmit the SCI by applying the two-stage SCI transmission scheme through different radio resources.

The second terminal 1222 may transmit two messages using different radio resources divided according to time or frequency, as in the exemplary embodiments of FIGS. 11A to 11C. The first message may be a message that can be demodulated and decoded by all terminals. The first message may include information necessary for sidelink channel sensing. In addition, the second message may be a message that can be demodulated and decoded only by specific terminals. The second message may include control information necessary for demodulation of a sidelink channel (e.g., PSSCH). The sidelink received signal strength may be included in the second message.

According to another exemplary embodiment of the present disclosure, the second terminal 1222 may generate an SL-SCH including the sidelink received signal strength information, and transmit a PSSCH including the SL-SCH to the first terminal 1221 (S1206).

The second terminal 1222 that transmits the sidelink received signal strength information through the SL-SCH may transmit the sidelink received signal strength information through an RRC message and/or a MAC-CE message. The second terminal 1222 may transmit the sidelink received signal strength information to the base station 1210 through a UCI of a PUCCH and/or a PUSCH. The base station 1210 obtaining the sidelink received signal strength information from the second terminal 1222 may transmit the corresponding information to the first terminal 1221 through a downlink signal such as a PDCCH and/or a PDSCH.

The second terminal 1222 may transmit the sidelink received signal strength information having a received signal strength value form of watts or dBm to the first terminal 1221. Alternatively, the second terminal 1222 may transmit to the first terminal 1221 the sidelink received signal strength information having a form of an index indicating one value belonging to a list of the preconfigured number of received signal strength values of watts or dBm, which is configured by an RRC message or preconfigured. The sidelink received signal strength information may be a bit string obtained by converting the index indicating the one value belonging to the list of received signal strength values.

According to an exemplary embodiment of the present disclosure, the second terminal 1222 may initially transmit a sidelink signal including the entire sidelink received signal strength information by a preconfigured number of times. In addition, the second terminal 1222 that has transmitted the sidelink signal by the preconfigured number of times may transmit a sidelink signal including partial information based on least significant bits (LSBs) of the sidelink received signal strength information.

According to another exemplary embodiment of the present disclosure, the second terminal 1222 may initially transmit a sidelink signal including the sidelink received signal strength information by a preconfigured number of times. In addition, the second terminal 1221 that has transmitted the sidelink signal by the preconfigured number of times may transmit a sidelink signal including information on a change in the sidelink received signal strength. The information on the change in the sidelink received signal strength may be an absolute change amount and/or a change ratio in the sidelink received signal strength. For example, when the sidelink received signal strength of the previously received sidelink signal is X dBm and the sidelink received signal strength of the currently received sidelink signal is Y dBm, the sidelink signal may include a difference value of (Y−X) dBm. A range of the difference between the received signal strengths of the sidelink signal may be configured to be smaller than the minimum-to-maximum range of the sidelink received signal strength. For example, when the received signal strength of the previously received sidelink signal is X dBm and the received signal strength of the currently received sidelink signal is Y dBm, the sidelink signal may include a change ratio value of (Y/X*100)%.

The first terminal 1221 may obtain information on the sidelink received signal strength and/or the path loss between the terminals from the second terminal 1222 (S1206). The first terminal 1221 may determine a transmit power of the sidelink signal based on the path loss between the terminals (S1207). The first terminal 1221 may determine a transmit power according to a level required for the second sidelink signal as the transmit power of the sidelink signal. The first terminal 1221 may determine the transmit power of the sidelink signal to be proportional to the path loss between the terminals.

The first terminal 1221 may transmit the second sidelink signal by applying the determined sidelink transmit power (S1208). For example, the first terminal 1221 may transmit a PSCCH, PSSCH, and/or PSFCH by applying the determined sidelink transmit power. The transmit powers of the sidelink channels (e.g., PSCCH, PSSCH, PSFCH, etc.) of the second sidelink signal may be the same.

The exemplary embodiments of the present disclosure may be applied to vehicle-to-vehicle (V2V) communication, vehicle-to-pedestrian (V2P) communication, vehicle-to-infrastructure (V2I) communication environments, or the like. In addition, the exemplary embodiments of the present disclosure may be applied to the downlink transmission as well as the sidelink transmission.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. An operation method of a transmitting terminal, performed in a communication system, the operation method comprising:
receiving, from a base station, sidelink resource allocation information and information on filter coefficients;
transmitting a first sidelink signal to a receiving terminal based on the sidelink resource allocation information;
receiving a second sidelink signal including information on a received signal strength of the first sidelink signal from the receiving terminal;
calculating a path loss experienced by the first sidelink signal based on a transmit power of the first sidelink signal and the received signal strength of the first sidelink signal;
determining a transmit power of a third sidelink signal based on the path loss experienced by the first sidelink signal; and
transmitting the third sidelink signal to the receiving terminal according to the transmit power of the third sidelink signal,
wherein the received signal strength is a value that the second terminal obtains by performing layer-3 (L3) filtering on a layer-1 (L1) reference signal received power (RSRP) measured on the first sidelink signal according to the filter coefficients.

2. The operation method according to claim 1, wherein the sidelink resource allocation information instructs the transmitting terminal to calculate the path loss experienced by the first sidelink signal.

3. The operation method according to claim 1, wherein the third sidelink signal further includes information on the transmit power of the third sidelink signal.

4. The operation method according to claim 3, wherein the third sidelink signal further includes information on a change in a transmit power of the second sidelink signal compared to the transmit power of the first sidelink signal.

5. The operation method according to claim 1, wherein the transmit power of the first sidelink signal is determined to be proportional to a bandwidth of the first sidelink signal.

6. The operation method according to claim 5, wherein the transmit power of the first sidelink signal is determined to be proportional to a modulation and coding scheme (MCS) of the first sidelink signal.

7. An operation method of a receiving terminal, performed in a communication system, the operation method comprising:
receiving, from a base station, sidelink resource allocation information and information on filter coefficients;
receiving a first sidelink signal from a transmitting terminal based on the sidelink resource allocation information;
obtaining a received signal strength of the first sidelink signal by performing layer-3 (L3) filtering on a layer-1 (L1) reference signal received power (RSRP) measured on the first sidelink signal according to the filter coefficients;
transmitting a second sidelink signal including information on the received signal strength of the first sidelink signal to the transmitting terminal; and
receiving a third sidelink signal from the transmitting terminal, the third sidelink signal having a transmit power determined based on a path loss calculated by the transmitting terminal based on a transmit power of the first sidelink and the received signal strength of the first sidelink signal.

8. The operation method according to claim 7, wherein the third sidelink signal further includes information on the transmit power of the third sidelink signal.

9. The operation method according to claim 7, wherein the third sidelink signal further includes information on a change in a transmit power of the second sidelink signal compared to the transmit power of the first sidelink signal.

10. The operation method according to claim 7, wherein the transmit power of the first sidelink signal is determined to be proportional to a bandwidth of the first sidelink signal.

11. The operation method according to claim 7, wherein the transmit power of the first sidelink signal is determined to be proportional to a modulation and coding scheme (MCS) of the first sidelink signal.

* * * * *